INVENTORS
Ernst Hink
Peter Holz
BY
Bailey, Stephens & Huettig

United States Patent Office 3,139,160
Patented June 30, 1964

3,139,160
BRAKE ESPECIALLY FOR ELECTRIC MOTORS
Ernst Hink and Peter Holz, Esslingen (Neckar), Germany, assignors to Eberhard Bauer Elektromotorenfabrik GmbH, Esslingen (Neckar), Germany
Filed June 21, 1962, Ser. No. 204,205
Claims priority, application Germany Oct. 7, 1961
12 Claims. (Cl. 188—171)

This invention relates to a brake, especially for electric motors, in which a brake disc connected with the shaft to be braked is pressed through the resilient pressure of a pressure plate against a stationary brake surface and the pressure plate is moved away by a forked lever pivoted on a stationary abutment and a transmitting lever co-operating with the forked lever and operated by an electro magnet. Such brakes are used in electric motors which are used as positioning motors in control circuits. They have the purpose of preventing any movement of the motor after it is switched off or to avoid any turning of the stationary motor. Such motors provided with similar brakes are also used for the driving of machine tools.

It is known to construct brakes for electric motors in which the pressure plate is pressed against by a spring spindle fastened on a base plate, which exerts a pressure axially at the mid-point of the pressure plate. The tension of the pressure spring contained in the pressure spindle is variable, so that the pressure with which the pressure plate is pushed against the brake disc is adjustable. The moving away or the release of the brake is accomplished by a fork-shaped lever pivoted on a stationary abutment, which carries a pressure member which on one side lies against the pressure plate and on the other side is subjected to the operation of the spring spindle. Because the spring pressure with which the brake disc is pressed against the brake surface should not be less than a predetermined amount, in order to ensure an instantaneous stopping of the motor, while, on the other hand, the magnet serving for the release of the brake should not exceed a predetermined size, a lever transmission is provided between the fork-shaped lever and the armature of the electro magnet. This transmission consists of a two-armed lever extending in the axial direction of the motor in the neighborhood of the upper end of the fork-shaped lever and pivoted on a stationary base plate, of which the shorter arm cooperates through a bearing roller with the fork-shaped lever, while the longer arm is pivotally connected by a rod to the armature of the magnet. This known construction, combined with the spring spindle extending in the axial direction, which, considering the force provided by the spring contained in it, has an exceptionally great length, requires a quite large space. But because motors with such brakes, in general, in other arrangements, such as machine tools, are used where only small space is available, this high requirement of space for the brake is extremely disadvantageous.

According to the invention, it is the purpose of this invention to avoid this disadvantage and to provide a brake, which, while requiring less space, is simple, safe in operation and of sturdy construction.

According to the invention, a fork-shaped lever pivoted on a stationary base plate is provided with a wedge-shaped surface, which is so positioned as to provide a space between it and the base plate tapering in one direction, in which an operating member is movable, which is connected to the armature of the magnet, and which is movable back and forth in the tapering space and thereby swings the fork-shaped lever on its abutment in the direction for releasing the brake. The wedge angle of the wedging surface is advantageously such that the operating member, upon deenergization of the magnet, is automatically moved back outwardly of the tapering space through the action of the spring pressure of the brake.

The operating member is in general a cylindrical roller, which is journalled in a guiding fork connected with the armature of the magnet. In order to keep the friction resulting from the movement of the operating member as low as possible, it is advantageous to construct the cylindrical roller with three adjacent roll portions, of which the two outer ones roll on the guide plate and have a smaller diameter than the inner one, against which the wedge surface arranged on a projection of the fork-shaped lever engages. It is also especially advantageous in constructing the new brake that the pressure plate is subjected to the operation of a flat spring, or bundle of plate springs, connected with the base plate, whose tension is adjustable.

The brake according to the invention has a quite short structural length and compact shape. The swinging of the fork-shaped lever for the release of the brake by the wedge surface requires, because the lever is pivoted on a stationary abutment, a double lever transmission for transmitting the force of the magnet.

This also makes it possible to use an electromagnet which is compact and quite small, so that the whole brake has only a small requirement of space. Because only the brake disc which is connected with the shaft to be braked is pressed by the pressure plate against a stationary brake surface during operation of the brake, no pressure is exerted in the axial direction against the armature of the motor. The braking pressures are principally taken up by a construction which is stationarily connected with the housing.

Further objects and advantages of the invention will appear more fully from the following description, particularly when taken in conjunction with the accompanying drawings which form a part thereof.

Figure 1:
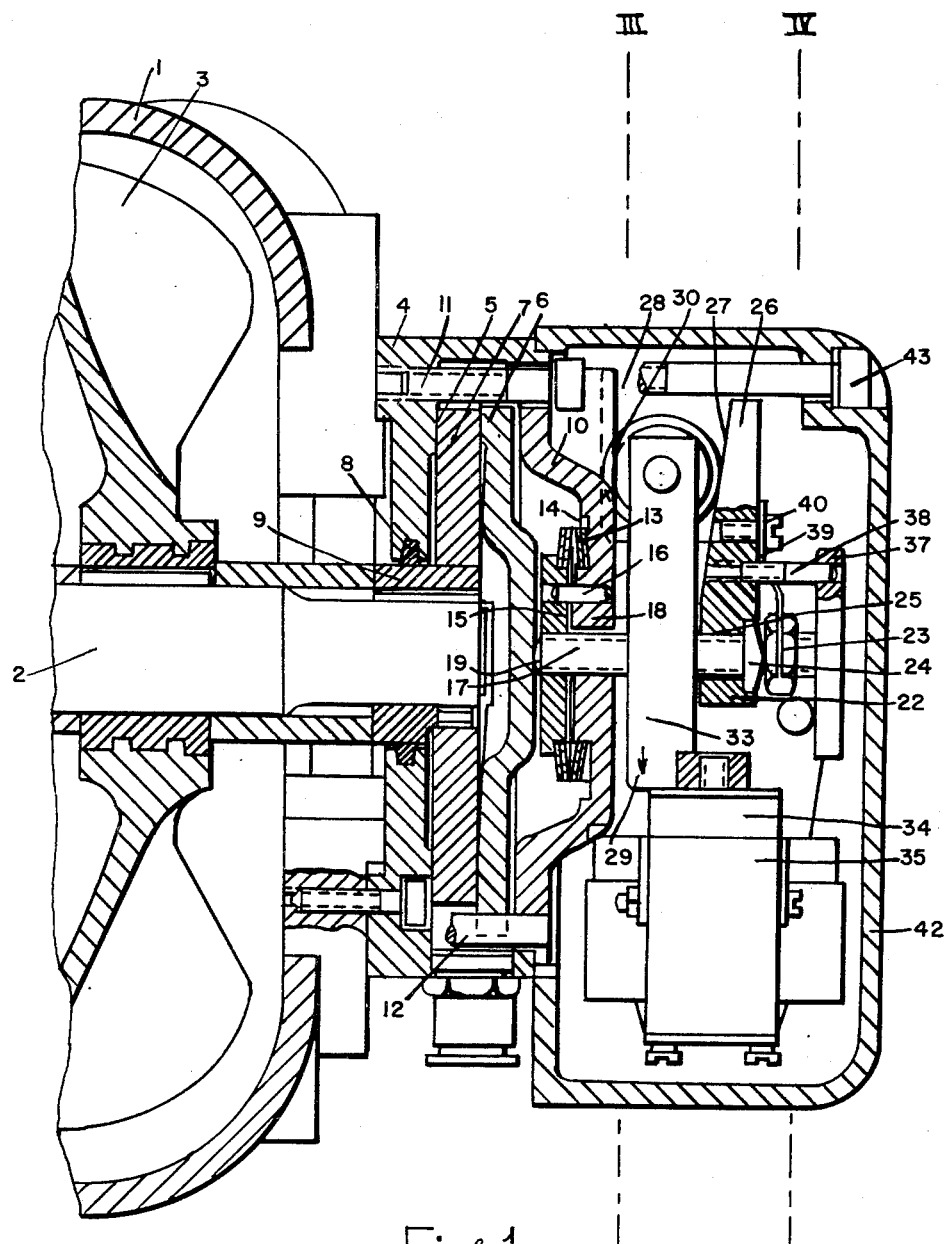
FIG. 1 shows in vertical cross-section a brake construction embodying the invention.

On the bearing frame of a conventional electric motor a ventilating casing 1 is fastened in the usual manner which encloses a fan 3 fixed on the motor shaft 2, and at its end has a centering flange 4, which is provided at 5 with a braking surface, on which a brake disc 7 can be pressed by a pressure plate or disc 6. The centering flange 4 is sealed through a felt ring 8 on a sleeve 9 press-fitted on the shaft 2, on which the brake disc 7 is mounted and secured against relative rotation. The brake disc 7 is formed of the conventional material for brakes, such as vulcanized fiber.

A base plate 10 is fastened to flange 4 by screws 11, and carries a cylindrical stud 12, which acts to prevent turning and to guide and mount the pressure plate 6.

Between the base plate 10 and the pressure disc 6, and coaxially to the brake disc 7 and the motor shaft 2, is arranged a bundle of disc springs 13, which is set in a recess 14 in the base plate 10 and engages against similar disc springs mounted on a concentric disc spring carrying member 15. The carrier 15, which is prevented from turning by a cylindrical stud 16, is provided in the center with a threaded bolt 17 which extends through an opening 18 in the base plate 10 and with its end 19, presses centrally against the pressure plate 6 so that the spring pressure exerted by the plate springs 13 is transferred to the pressure plate 6. The carrier 15 and bolt together constitute a pressure member.

A fork-shaped lever 22 is pivoted at 20 and 21 on the bass plate 10. Against this lever, through a washer 24, a nut 23 presses, which is threadedly arranged on the bolt 17 which extends through a bore 25 of the fork-shaped lever 22. The fork-shaped lever 22 is provided at its upper end with a projection 26, which has a wedge-shaped surface 27, thus forming between it and the base plate 10 a space 28, which space changes in width in the direction of the axis of the shaft 2.

A roller 30 is movable in the space 28, which is arranged between two rollers 31, of smaller diameter, all freely turnable on a shaft 32 which is mounted in a guide fork 33. The guide fork 33 is connected with the armature 34 of an electromagnet 35, the supply lines of which are shown at 36. Roller 30 engages the wedge surface of lever 26, while rollers 31 engage the converging surface of plate 10 on opposite sides of a groove 30, in which roller 30 moves.

If the electromagnet is energized, the guide fork 33 is drawn downward in the direction of the arrow 29 (FIG. 1). The bearing roller 30 is moved downward in the tapering space 28, which results in swinging the fork-shaped lever 22 about its pivots 20 and 21 outwardly, or clockwise in FIG. 1. This moves bolt 17 to the right and releases the brake.

When the magnet is de-energized, the bearing roller 30 is moved back upwardly in space 28, under the action of disc springs 14 exerted through wedge surface 27. The angle of inclination of the wedge surface is so chosen that the operating member can move back upwardly in space 28.

For adjusting the friction of the braking disc, the bolt 17 is provided with a knob 37 which can be locked in position by a bolt pin 38 engageable in holes 39. By turning the knob 37, the bolt 17 is screwed further into the spring carrier 15 to compensate for increase of the air gap caused by wear. By adjusting the nut 23, which is held in position by a locking plate 39 and a screw 40, the braking movement can be adjusted.

Figure 2:
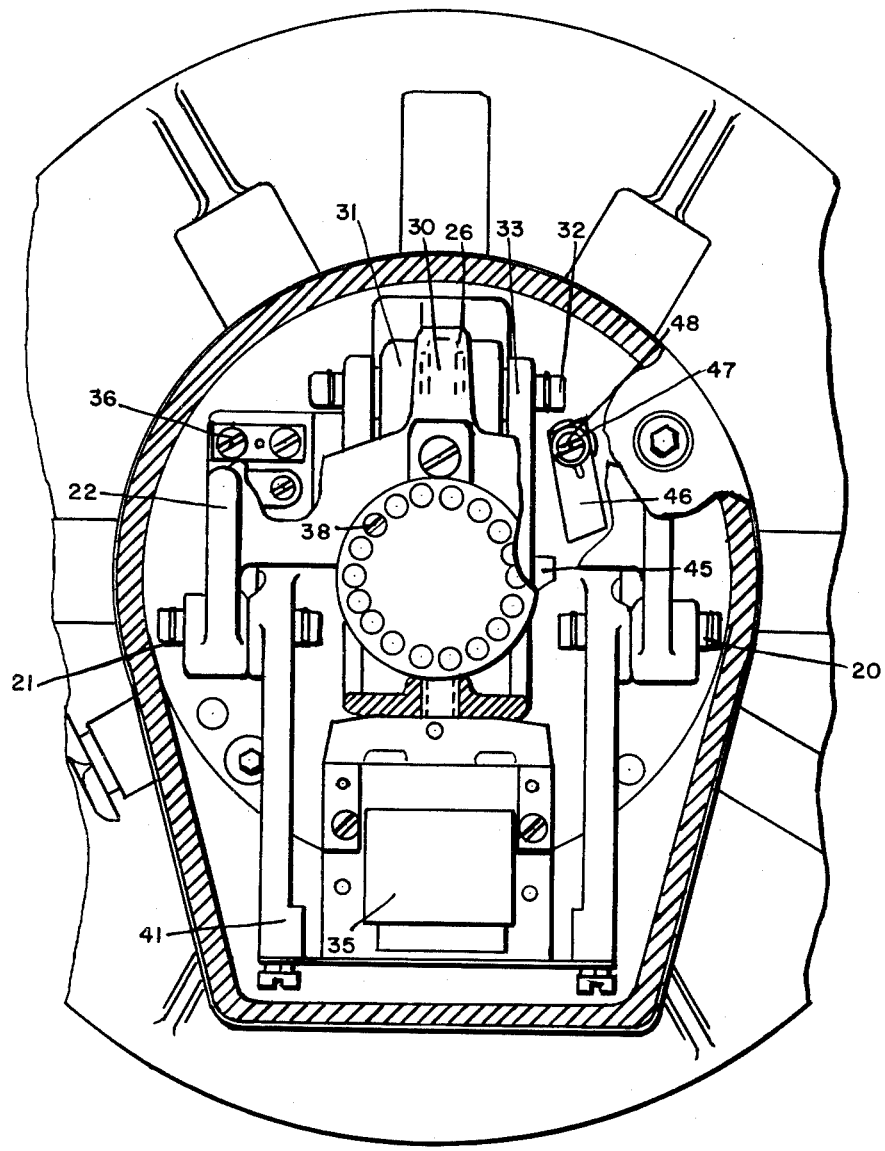
FIG. 2 is a view from the right of FIG. 1 with parts broken away.
Figure 3:
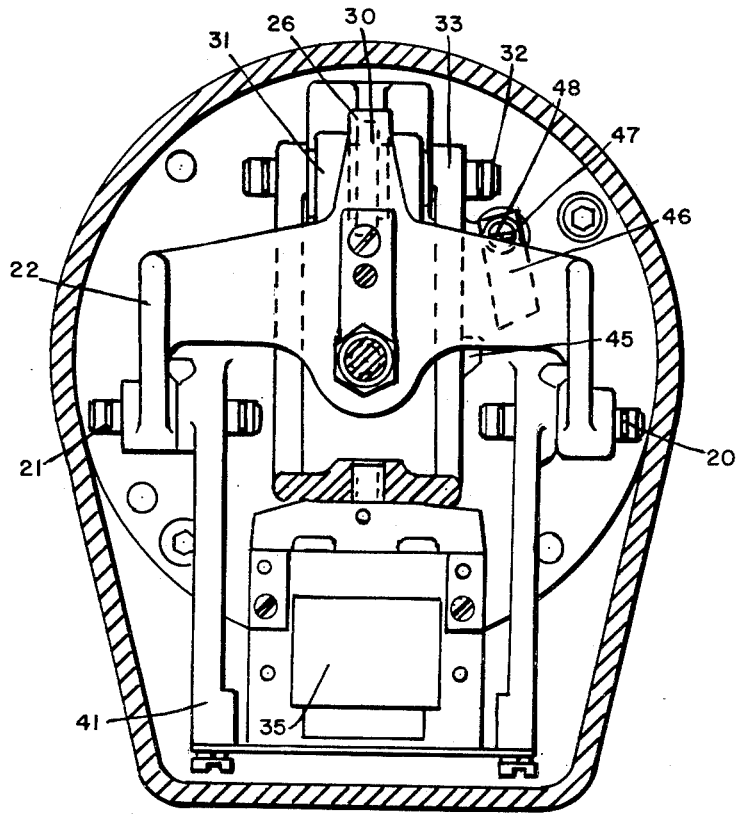
FIGS. 3 and 4 are cross-sections on the line III—III and IV—IV respectively of FIG. 1.
Figure 4:
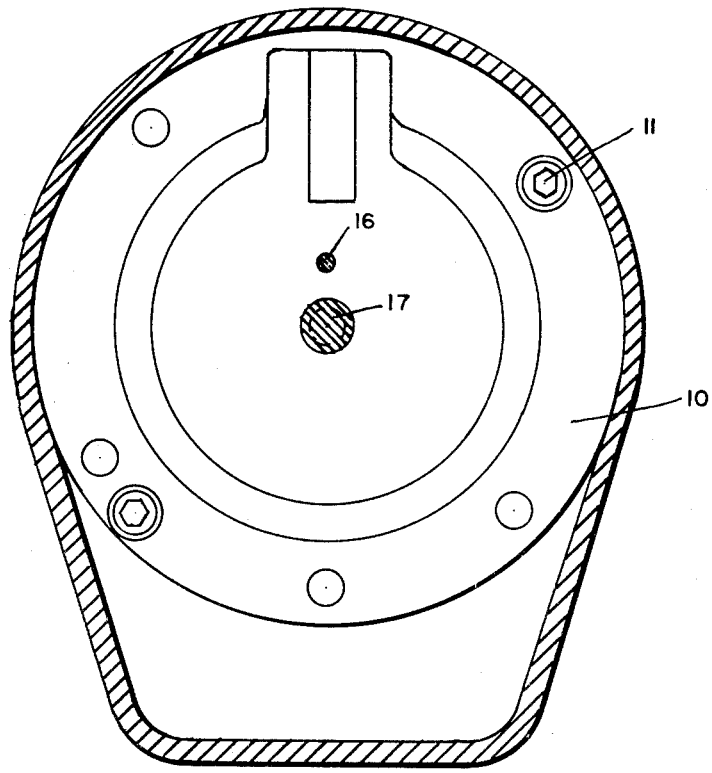
Figure 5:
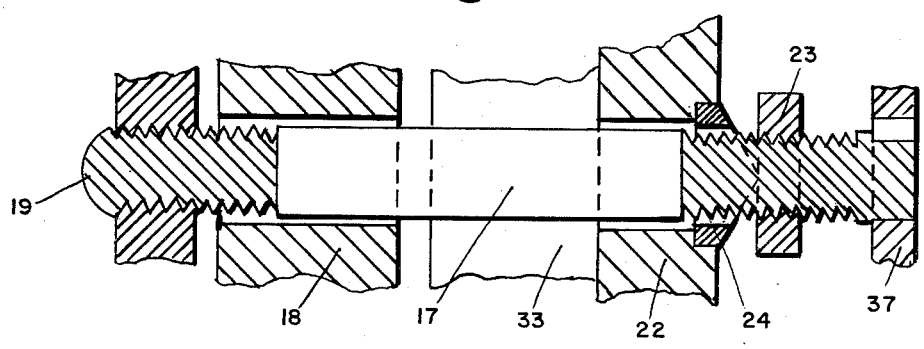
FIG. 5 is an enlargement of a part of FIG. 1.

The magnet is mounted in a stirrup 41 (FIGS. 1 and 2) so as to need only a small space, so that the brake has a very compact construction. It is covered by a cap 42, which is connected by bolts 43 to the base plate 10.

If now the current fails and, because the magnet is not energized, the brake is to be released and the motor shaft 2 is then able to turn, a nose 45 is provided on the guide fork 33, above which a pawl 46 can engage, which is pivotally mounted at 41 on the base plate. If the brake is to be released without the operation of the magnet 35, the cover 42 is removed and the guide fork 33 is pushed downward, for example, by hand, and the pawl 46 is swung above the nose 45. The position of the nose 45, as well as the length of the pawl 46, which is normally held in inoperative position by a spring 48, are so chosen that, upon the restoration of the current of the electromagnet 35, the armature 44 of the magnet can still move a small distance downward. This releases the pawl 46 from the nose 45, so that the spring 46 returns the pawl 46 to its inoperative position.

While we have described herein one embodiment of our invention, we wish it to be understood that we do not intend to limit ourselves thereby except within the scope of the claims hereto or hereinafter appended.

We claim:

1. In combination, a housing, a shaft rotatably mounted in the housing, a brake disc secured on the shaft for rotation therewith, a member nonrotatably carried by the housing having a braking surface opposite the surface of the brake disc, a pressure member on the other side of the brake disc from said member movable axially of the shaft in one direction to engage the brake disc and press it against the braking surface, spring means between the pressure member and the housing for normally urging the pressure member in said first direction, and a lever pivoted on the housing and operatively connected with said pressure member, said lever and housing having opposed converging surfaces forming a tapering space therebetween, an electromagnet carried by the housing having an armature, and an operating member operatively connected to said armature and engaged between, and having free rolling contact with both of, said converging surfaces to move between them in the direction of convergence when the magnet is energized to swing said lever in a direction to move said pressure member in the other direction against the action of the spring means to release the brake.

2. In a device as claimed in claim 1, the angle of convergence of such surface being such that the operating member is moved by the action of said spring means in the direction of divergence of said surfaces when the magnet is de-energized.

3. In a device as claimed in claim 1, said operating member including a guide member and roller means journalled on said guide member and engaging said converging surfaces.

4. In a device as claimed in claim 3, said roller means including a central roller of one diameter engaging one of the converging surfaces and two outer rollers of different diameter, engaging the other converging surface, said rollers being mounted for free rotation relative to each other.

5. In a device as is claimed in claim 4, said central roller having a greater diameter than the outer rollers.

6. In a device as is claimed in claim 1, in which said housing includes a base plate on the opposite side of the pressure member from the brake disc, said spring means including flat plate springs between the base plate and the pressure member.

7. In a device as claimed in claim 6, said lever having an opening therethrough, the operative connection between the lever and the pressure member including a part extending through said opening, and an element carried by said part and engaging the lever on the opposite side from the pressure member, the distance between the element and the pressure member being adjustable.

8. In a device as claimed in claim 6, said lever having an opening therethrough, the operative connection between the lever and the pressure member including a spring carrier and a bolt threaded in the spring carrier and extending through said opening, and means threaded on the bolt on the other side of the lever from the carrier for engaging the lever.

9. In a device as claimed in claim 1, said lever being forked and being pivoted at the ends of the legs of the fork, said magnet being positioned at least in part between said legs.

10. In a device as claimed in claim 1, means engageable with the operating member when moved in the direction of convergence of the converging surfaces to hold the operating member against movement in the opposite direction independently of the magnet so as to keep the brake disengaged.

11. In a device as claimed in claim 10, said last means comprising a nose carried by said operating member and a pawl pivoted on the housing and swingable into the path of said nose.

12. In a device as claimed in claim 11, spring means normally urging said pawl to a position out of the path of the nose, said operating member being movable in the direction of convergence of the surfaces slightly beyond the position in which it is held by said pawl, so that the pawl is released when the magnet is energized.

References Cited in the file of this patent

UNITED STATES PATENTS

| 461,052 | Shaw | Oct. 13, 1891 |
| 2,213,340 | Ellars | Sept. 3, 1940 |
| 2,217,464 | Arnold | Oct. 8, 1940 |
| 2,620,901 | Stearns | Dec. 9, 1952 |
| 3,045,782 | Hansen | July 24, 1962 |

FOREIGN PATENTS

| 477,926 | Germany | June 15, 1929 |